United States Patent
Tang

(10) Patent No.: US 11,929,073 B2
(45) Date of Patent: *Mar. 12, 2024

(54) HYBRID ARBITRATION SYSTEM

(71) Applicant: Cerence Operating Company, Burlington, MA (US)

(72) Inventor: Min Tang, Yarrow Point, WA (US)

(73) Assignee: Cerence Operating Company, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,663

(22) Filed: Oct. 3, 2022

(65) Prior Publication Data
US 2023/0169971 A1 Jun. 1, 2023

Related U.S. Application Data

(63) Continuation of application No. 16/830,638, filed on Mar. 26, 2020, now Pat. No. 11,462,216.

(60) Provisional application No. 62/825,391, filed on Mar. 28, 2019.

(51) Int. Cl.

| | | |
|---|---|---|
| G10L 15/00 | (2013.01) | |
| G06N 3/08 | (2023.01) | |
| G10L 15/02 | (2006.01) | |
| G10L 15/16 | (2006.01) | |
| G10L 15/18 | (2013.01) | |
| G10L 15/22 | (2006.01) | |
| G10L 15/30 | (2013.01) | |

(52) U.S. Cl.
CPC .............. *G10L 15/22* (2013.01); *G06N 3/08* (2013.01); *G10L 15/02* (2013.01); *G10L 15/16* (2013.01); *G10L 15/1815* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,186,262 B2 | 1/2019 | Klein et al. | |
| 10,354,650 B2 * | 7/2019 | Gruenstein | G10L 15/32 |
| 10,643,605 B2 * | 5/2020 | Ryu | G10L 15/20 |
| 10,847,160 B2 * | 11/2020 | Gruenstein | G10L 15/26 |
| 11,462,216 B2 * | 10/2022 | Tang | G10L 15/02 |
| 11,580,987 B2 * | 2/2023 | Kim | G10L 15/22 |
| 11,810,571 B2 * | 11/2023 | Kim | G06F 16/90332 |
| 2013/0346078 A1 | 12/2013 | Gruenstein et al. | |
| 2018/0197543 A1 | 7/2018 | Gruenstein et al. | |
| 2018/0342236 A1 | 11/2018 | Ryu et al. | |
| 2019/0043496 A1 | 2/2019 | Tal et al. | |
| 2020/0118544 A1 * | 4/2020 | Lee | G10L 15/063 |
| 2023/0126305 A1 * | 4/2023 | Kim | G06F 3/167 704/275 |

(Continued)

*Primary Examiner* — Satwant K Singh
(74) *Attorney, Agent, or Firm* — Occhiuti & Rohlicek LLP

(57) ABSTRACT

A method for selecting a speech recognition result on a computing device includes receiving a first speech recognition result determined by the computing device, receiving first features, at least some of the features being determined using the first speech recognition result, determining whether to select the first speech recognition result or to wait for a second speech recognition result determined by a cloud computing service based at least in part on the first speech recognition result and the first features.

15 Claims, 4 Drawing Sheets

(56) References Cited

U.S. PATENT DOCUMENTS

2023/0297327 A1\* 9/2023 Pasko .................... G06F 3/167
              704/275

\* cited by examiner

```
1   Arbitrator
2   receive($R_E, \{F_E\}$)
3   $C_E^{ss}$ = classifier$_{ss}$($R_E, \{F_E\}$)
4   if ($C_E^{ss} \geq T_1$) {
5       $R_F, \{F_F\} = R_E, \{F_E\}$
6   }
7   else {
8       waitFor($R_C, \{F_C\}$)
9       $C_E^{sys}, C_C$ = classifier$_{sys}$($R_E, \{F_E\}, R_C, \{F_C\}$)
10      if ($C_C \geq C_E^{sys}$) {
11          $R_F, \{F_F\} = R_C, \{F_C\}$
12      }
13      else {
14          $R_F, \{F_F\} = R_E, \{F_E\}$
15      }
16  }
```

//HYBRID ARBITRATION SYSTEM

CROSS-REFERENCES TO RELATED APPLICATIONS

This application is a continuation of U.S. application Ser. No. 16/830,638, filed on Mar. 26, 2020, which claims the benefit of U.S. Provisional Application No. 62/825,391 filed on Mar. 28, 2019, the contents of which are incorporated herein by reference.

BACKGROUND OF THE INVENTION

This invention relates to an arbitration scheme for an automatic speech recognition and natural language understanding system.

With recent advances in deep learning technologies in speech recognition and the availability of affordable broadband internet to mobile devices, commercial voice interface systems (e.g., smart device and automotive voice assistant systems) are increasingly using hybrid automatic speech recognition (ASR) and natural language understanding (NLU) architectures.

In hybrid ASR architectures, ASR and NLU functionality is provided by both on-device (sometimes referred to as 'embedded') processing and server-based processing (sometimes referred to as "cloud-based" processing). The on-device processing typically has access to fewer computing resources, but advantageously has access to personal user data that it can use to improve its ASR and NLU results (e.g., by incorporation into ASR/NLU models). Cloud-based processing advantageously may have access to powerful and flexible computing resources but often lacks access to personal user data because users of speech-driven solutions have become increasingly concerned about sharing their personal on-device data, such as contacts or music, with on-line services.

SUMMARY OF THE INVENTION

Because on-device processing and cloud-based processing of speech input have differing levels of computational resources and access to personal data, they often return differing results. Hybrid arbitration schemes are used to select between an on-device result and a cloud-based result for responding to a user input. For example, on-device and cloud-based processing are performed in parallel and a hybrid arbitration scheme is used to select the best result from on-device and cloud-based processing outputs. The arbitration scheme may consider factors such as latency tolerance, cost, security, computation power, and network capacity when deciding which result to choose. The approach to hybrid arbitration generally relies on more than ASR confidence features and application specific heuristics to select the best result from the on-device and cloud-based processing inputs.

The present approach may improve over using ASR confidence features and application specific heuristics alone in hybrid arbitration scheme capturing subtle context specific differences between results. Furthermore, word level and sentence level confidence scores and other confidence-related features are made available outside the decoder layer, which makes them available to an external hybrid arbitration module.

Aspects described herein address these drawbacks by using ASR confidence features in conjunction with raw ASR strings and NLU features in a hybrid arbitration scheme for selecting the best ASR and NLU result from on-device and cloud-based processing outputs.

In a general aspect, a method for selecting a speech recognition result on a computing device includes receiving a first speech recognition result determined by the computing device, receiving first features, at least some of the features being determined using the first speech recognition result, determining whether to select the first speech recognition result or to wait for a second speech recognition result determined by a cloud computing service based at least in part on the first speech recognition result and the first features.

Aspects may include one or more of the following features.

The method may include, based on the determining, waiting for the second speech recognition result. The method may include receiving the second speech recognition result, receiving second features, at least some of the features being determined using the second speech recognition result, and determining whether to select the first speech recognition result or the second speech recognition result based at least in part on the first speech recognition result, the first features the second speech recognition result, and the second features.

Determining whether to select the first speech recognition result or the second speech recognition result may include computing a first confidence value for the first speech recognition result and a second confidence value for the second speech recognition result based at least in part on the first speech recognition result, the first features, the second speech recognition result, and the second features, and comparing the first confidence value to the second confidence value. Computing the first confidence value and the second confidence value may include processing the first speech recognition result and the first features, in a classifier. The classifier may be implemented as a neural network. The method may include selecting the first speech recognition result if the first confidence value exceeds the second confidence value.

At least some of the second features may characterize a quality of the second speech recognition result. The second features may include one or more of a natural language understanding dialogue context, a natural language understanding recognized domain name, a natural language understanding recognized context name, a natural language understanding recognized action name, one or more natural language understanding recognized entity names, and an NBest word sequence.

At least some of the first features may characterize a quality of the first speech recognition result. The first features may include one or more of a natural language understanding dialogue context, a natural language understanding recognized domain name, a natural language understanding recognized context name, a natural language understanding recognized action name, one or more natural language understanding recognized entity names, and an NBest word sequence.

The determining may include computing, based at least in part on the first speech recognition result and the first features, a confidence value for the first speech recognition result and comparing the confidence value to a first predetermined threshold. The method may include selecting the first speech recognition result if the confidence value exceeds the first predetermined threshold. The method may include waiting for the second speech recognition result if the confidence value does not exceed the first predetermined threshold. The computing may include processing the first speech recognition result and the first features in a classifier. The classifier may be implemented as a neural network.

The first speech recognition result and the first features may be determined based at least in part on user data stored on the computing device. The method may include performing an action based at least in part on the selected speech recognition result.

In another general aspect, a system for selecting a speech recognition result on a computing device includes an input for receiving a first speech recognition result determined by the computing device, an input for receiving a first features, at least some of the features being determined using the first speech recognition result, one or more processors for processing the first speech recognition result and the first features to determine whether to select the first speech recognition result or to wait for a second speech recognition result determined by a cloud computing service based at least in part on the first speech recognition result and the first features.

In another general aspect, software stored on a non-transitory, computer-readable medium, includes instructions for causing one or more processors to receive a first speech recognition result determined by the computing device, receive a first features, at least some of the features being determined using the first speech recognition result, and determine whether to select the first speech recognition result or to wait for a second speech recognition result determined by a cloud computing service based at least in part on the first speech recognition result and the first features.

Aspects may have one or more of the following advantages.

Among other advantages, aspects described herein use ASR output, such as the top NBest word sequences from embedded and cloud, and NLU features, such as the dialogue context and recognized domain/context/action/criteria name, in the hybrid arbitration process in addition to confidence score features. Doing so in a deep-neural-network classifier achieves a significant improvement in ASR errors over conventional confidence-score and heuristic based systems.

Another advantage is that aspects described herein is that the user device is able to quickly obtain results by believing the results that it produces before receiving results from cloud-based processing, which often has a higher latency.

Other features and advantages of the invention are apparent from the following description, and from the claims.

DETAILED DESCRIPTION

1 Overview

Figure 1:
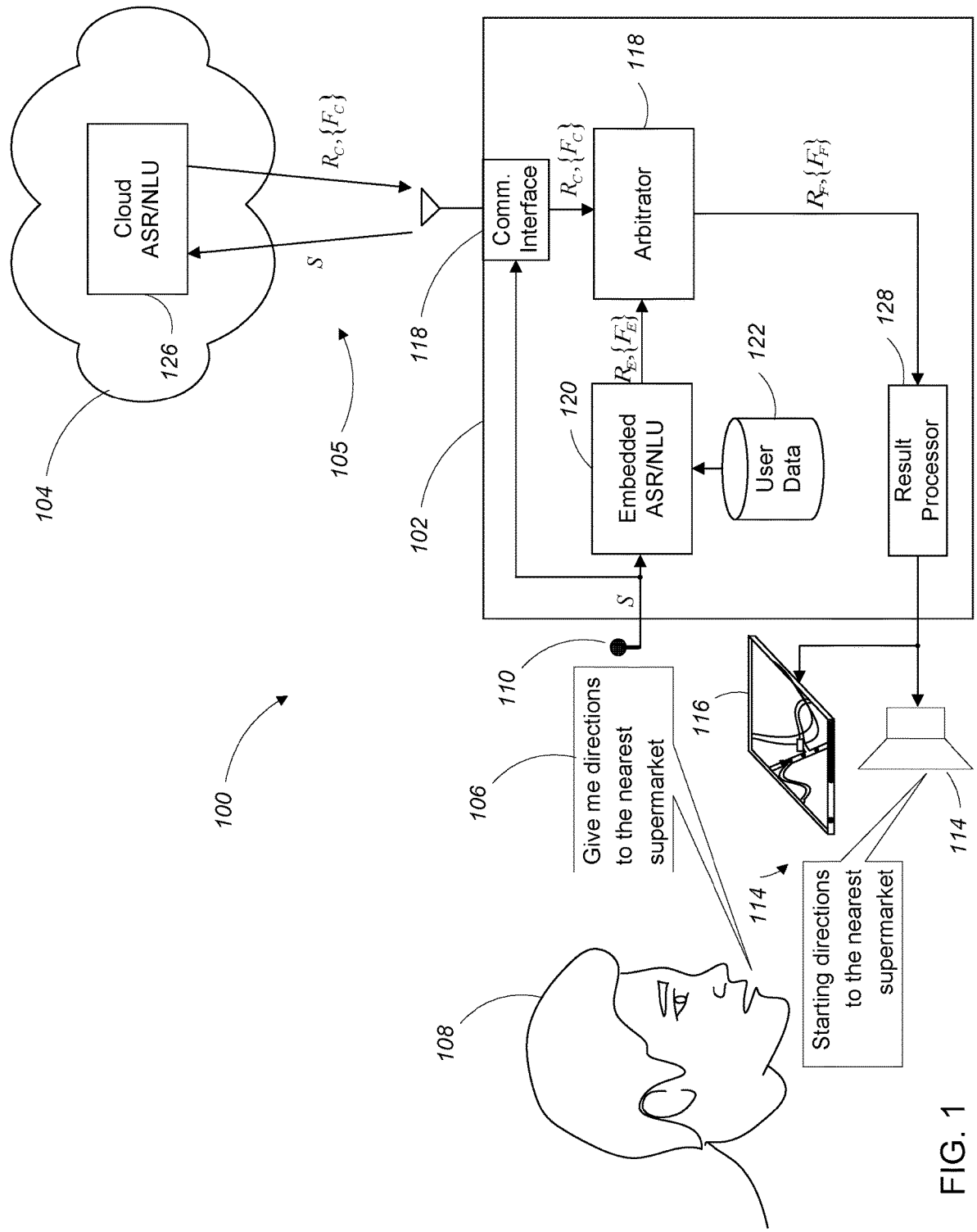
FIG. 1 is a hybrid automatic speech recognition system including an arbitrator.

Referring to FIG. 1 a hybrid automatic speech recognition (ASR) system 100 includes a user device 102 (e.g., a mobile device or an in-vehicle infotainment system) and a cloud-based service 104 that are in communication over a network connection 105 (e.g., over a 4G cellular data network). The user device 102 is configured to receive a voice command 106 spoken by a user 108 and to process the voice command 106 in both the user device 102 and in the cloud-based service to determine a result (e.g., an intent) associated with the voice command 106. The user device 102 then takes an action or provides feedback to the user based on the determined result.

As is described in greater detail below, part of the processing of the voice command 106 includes implementing a hybrid arbitration scheme to select the result associated with the voice command 106 from a result determined by the processing performed on the user device 102 and a result determined by the performed on the cloud-based service 104. Very generally, the hybrid arbitration scheme uses a variety of inputs including, for example, ASR confidence measures, raw ASR strings, and natural language understanding (NLU) features, in the selection process.

The user device 102 includes a microphone 110 (or another type of acoustic sensor), one or more output devices 112 (e.g., a loudspeaker 114 and a display 116), and a communication interface 118 (e.g., a cellular radio). For processing the voice command 106, the user device 102 includes an embedded ASR/NLU module 120, a user data store 122, an arbitrator 124, and a result processor 128.

In operation, the microphone 110 senses an acoustic signal associated with the voice command 106 and generates a speech signal, S. The speech signal, S is provided to the embedded ASR/NLU module 120 along with user data (e.g., user location, user gender, user age, user preferences, etc.) from the user data store 122 for processing.

The embedded ASR/NLU module 120 processes the speech signal, S to determine "embedded" result data, $R_E$ and a set of "embedded" features, $\{F_E\}$ (abbreviated herein as $R_E$, $\{F_E\}$). In some examples, the embedded result data, $R_E$ includes a string representing words recognized by the embedded ASR/NLU module 120 (e.g., "Give directions to the supermarket"). The set of embedded features, $\{F_E\}$ includes at least some NLU features that are determined using the embedded result data, $R_E$ and may also include ASR features. For example, the set of embedded features, $\{F_E\}$ may include one or more features such as ASR confidence scores, an NLU dialogue context, an NLU recognized domain (e.g., the navigation domain), an NLU recognized context name, an NLU recognized action name (e.g., provide directions to entity), NLU recognized entity names (e.g., "the supermarket"), and an ASR top NBest word sequence determined from a user utterance.

The speech signal, S is also provided to the communication interface 118 for processing in the cloud-based service 104. The communication interface 118 transmits the speech signal, S to the cloud based service 104, where it is processed by a "cloud" ASR/NLU module 126 to determine "cloud" result data, $R_C$ and a set of "cloud" features, $\{F_C\}$ (abbreviated herein as $R_C$, $\{F_C\}$).

In some examples, the cloud result data, $R_C$ includes a string representing words recognized by the cloud ASR/NLU module 124 (e.g., "Give me directions to the nearest supermarket"). The set of cloud features, $\{F_C\}$ includes at least some NLU features that are determined using the cloud result data, $R_C$ an may also include ASR features. For example, the set of embedded features, $\{F_C\}$ may include one or more features such as ASR confidence scores, an NLU dialogue context, an NLU recognized domain (e.g., the navigation domain), an NLU recognized context name, an NLU recognized action name (e.g., provide directions to entity), NLU recognized entity names (e.g., "the supermarket"), and an ASR top NBest word sequence determined from a user utterance.

Once computed, the cloud-based service 104 transmits $R_C$, $\{F_C\}$ back to the communication interface 118 of the user device 102.

The results and features, $R_E$, $\{F_E\}$ and $R_C$, $\{F_C\}$ are provided as input to the arbitrator 124. The arbitrator 124 processes one or more of its inputs to determine final result data, $R_F$ and a set of final features, $\{F_F\}$ (abbreviated herein as $R_F$, $\{F_F\}$). The final result and features, $R_F$, $\{F_F\}$ is provided as input to the result processor 128, which processes the inputs to take an appropriate action and/or provide feedback to the user 108. For example, the results processor 128 may cause an in-vehicle infotainment system to begin navigating the user 108 to the nearest supermarket and announce to the user that it is "Starting directions to the nearest supermarket."

2 Arbitration

In general, the embedded result and features $R_E$, $\{F_E\}$ arrives at the arbitrator 124 before $R_C$, $\{F_C\}$ due to, for example, the time required to transmit the speech signal, S, from the user device 102 to the cloud based service 104 and the time required to transmit $R_C$, $\{F_C\}$ from the cloud-based service 104 to the user device 102.

Figures 2, 3:
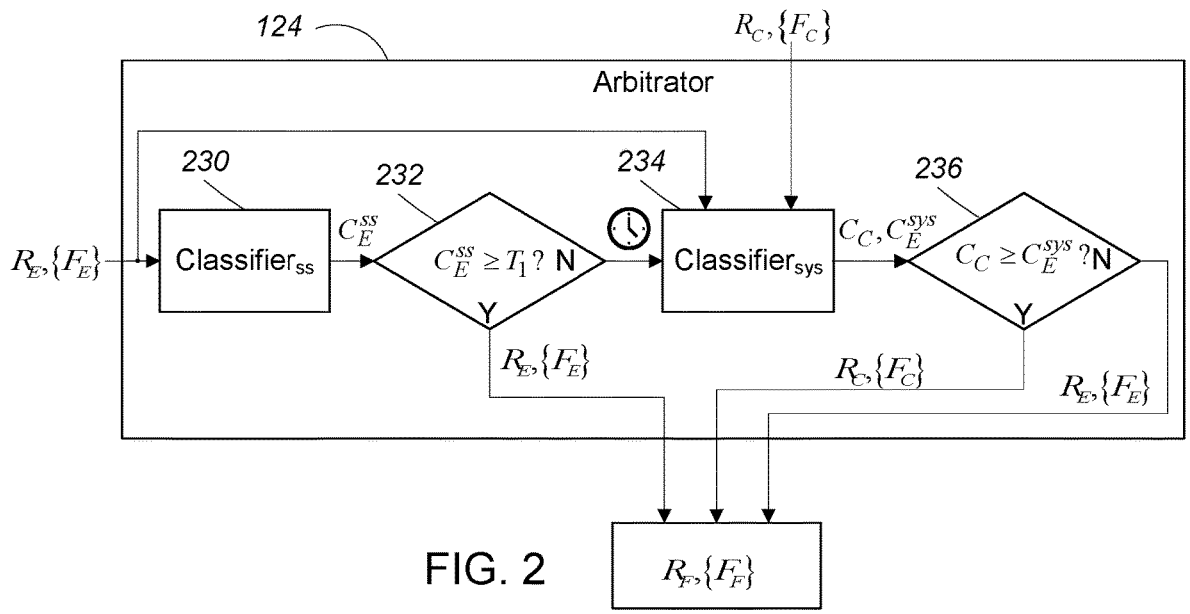
FIG. 2 is a detailed view of the arbitrator of FIG. 1.
FIG. 3 is a procedural representation of the arbitrator of FIG. 1.

Referring to FIGS. 2 and 3, in some examples, the arbitrator 124 implements an arbitration scheme that accounts for this difference in arrival times by processing $R_E$, $\{F_E\}$ prior to arrival of $R_C$, $\{F_C\}$ to determine if $R_E$, $\{F_E\}$ is sufficient to be output as $R_F$, $\{F_E\}$, even without considering $R_C$, $\{F_C\}$. If $R_E$, $\{F_E\}$ is sufficient, then $R_E$, $\{F_E\}$ is output as $R_F$, $\{F_F\}$ without waiting for $R_C$, $\{F_C\}$ to arrive. Otherwise the arbitrator 124 waits for arrival of $R_C$, $\{F_C\}$ and then processes $R_C$, $\{F_C\}$ and $R_E$, $\{F_E\}$ to select which of the two is output as $R_F$, $\{F_F\}$.

The arbitration scheme commences when the arbitrator 124 receives $R_E$, $\{F_E\}$ (see FIG. 3, line 2). $R_E$, $\{F_E\}$ is provided to a "short-circuit" classifier 230 which processes $R_E$, $\{F_E\}$ to determine an embedded confidence score, $C_E^{ss}$ associated with $R_E$, $\{F_E\}$ (see FIG. 3, line 3). The embedded confidence score, $C_E^{ss}$ is provided to a first decision point 232 where it is compared to a first predetermined threshold, $T_1$ (see FIG. 3, line 4). If the embedded confidence score, $C_E^{ss}$ exceeds the first predetermined threshold, $T_1$, then $R_E$, $\{F_E\}$ is assigned as $R_F$, $\{F_F\}$ and the arbitration scheme exits (see FIG. 3, line 5).

If the embedded confidence score, $C_E^{ss}$ does not exceed the first predetermined threshold, $T_1$, then the arbitration scheme waits for $R_C$, $\{F_C\}$ to arrive from the cloud-based service 104 (see FIG. 3, line 8). When $R_C$, $\{F_C\}$ arrives, both $R_C$, $\{F_C\}$ and $R_E$, $\{F_E\}$ are provided to a "system" classifier 234 to determine another embedded confidence score, $C_E^{sys}$ associated with $R_E$, $\{F_E\}$ and a cloud confidence score $C_C$ associated with $R_C$, $\{F_C\}$ (see FIG. 3, line 9). In some examples, the system classifier 234 is configured such that a sum of the embedded confidence score, $C_E^{sys}$ and the cloud confidence score, $C_C$ is equal to 1.

The embedded confidence score, $C_E^{sys}$ and the cloud confidence score, $C_C$ are provided to a second decision point 236 which compares the two scores to determine if the cloud confidence score, $C_C$ is greater than or equal to the embedded confidence score, $C_E^{sys}$ (see FIG. 3, line 10). If the cloud confidence score, $C_C$ is greater than or equal to the embedded confidence score, $C_E^{sys}$ then $R_C$, $\{F_C\}$ is assigned as $R_F$, $\{F_F\}$ and the arbitration scheme exits (see FIG. 3, line 11). Otherwise, if the cloud confidence score, $C_C$ is less than the embedded confidence score, $C_E^{sys}$ then $R_E$, $\{F_E\}$ is assigned as $R_F$, $\{F_E\}$ and the arbitration scheme exits (see FIG. 3, line 14).

Figure 4:
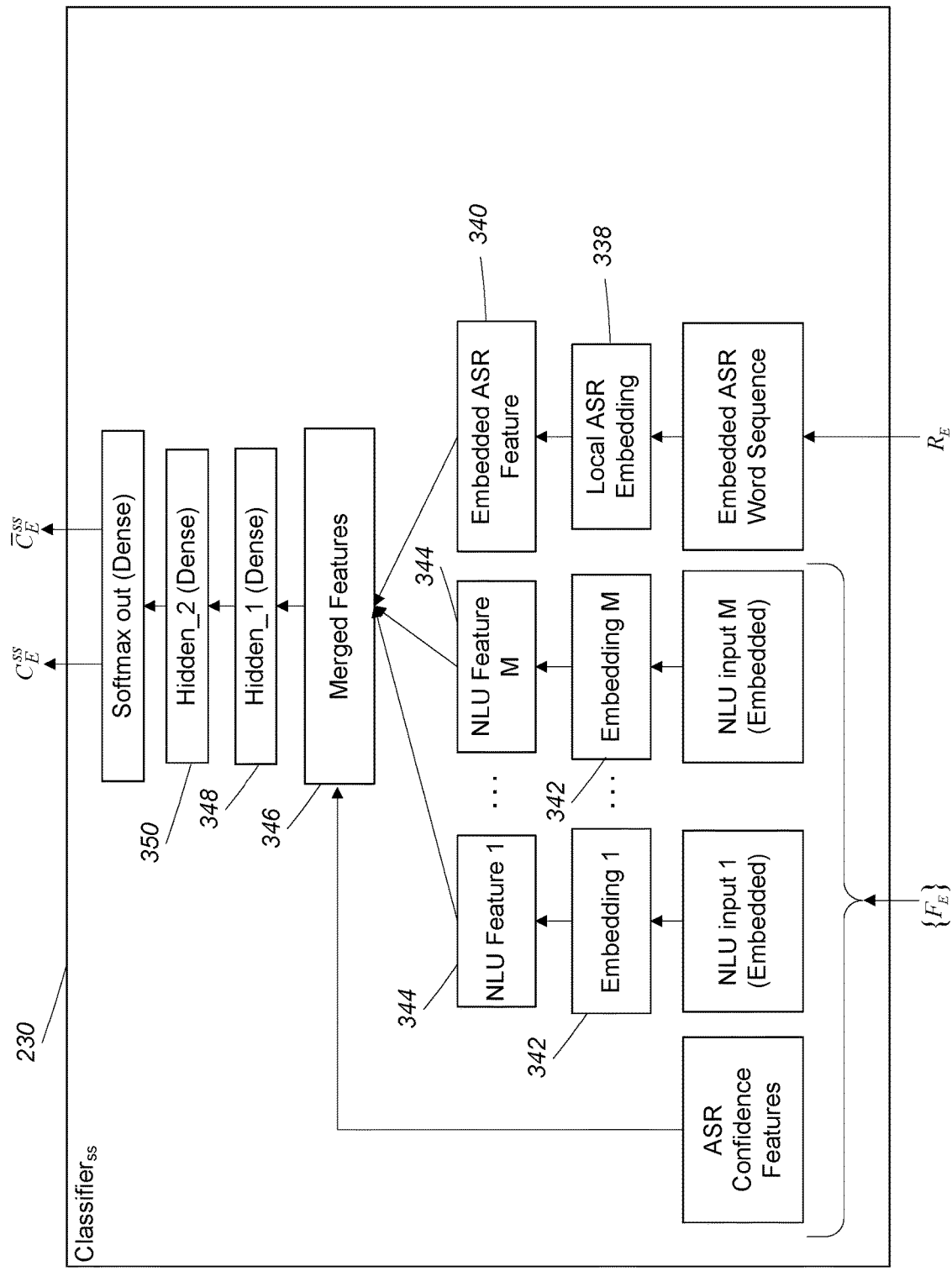
FIG. 4 is a short-circuit classifier.

Referring to FIG. 4, in some examples, the short circuit classifier 230 is implemented as a feed-forward deep neural network (DNN) classifier with ReLu activation on a hidden layer, and softmax activation on an output layer.

In an exemplary operation of the short circuit classifier 230, the inputs to the short circuit classifier 230 are first preprocessed. To do so, the embedded result, $R_E$ (sometimes referred to as the "embedded ASR word sequence") is processed in a local ASR embedding module 338 to form an embedded ASR feature 340. In some examples the local ASR embedding module 338 turns word sequences in $R_E$ into a word embedding having a vocabulary including the 1,000 most frequent words from the embedded ASR/NLU module 120, an entry for out-of-vocabulary words, and an entry for padding (e.g., the embedded ASR word sequence is padded or trimmed to 6 words).

The NLU features in the set of embedded features, $\{F_E\}$ are processed in NLU embedding modules 342 to form corresponding embeddings of the NLU features 344. In some examples, the embeddings of the NLU features 344 are used because the reduce a number of parameters in the input data, thereby reducing overfitting in the training of the short circuit classifier 230.

The embedded ASR feature 340, the embeddings of the NLU features 344, and ASR confidence features from the set of embedded features, $\{F_E\}$ are merged in an input layer to form merged features 346. The merged features 346 are processed in a first hidden layer 348, a second hidden layer 350, and a softmax output layer 352 to generate the embedded confidence score, $C_E^{ss}$ (and its complement, $\overline{C}_E^{ss}$ which is not used).

Figure 5:
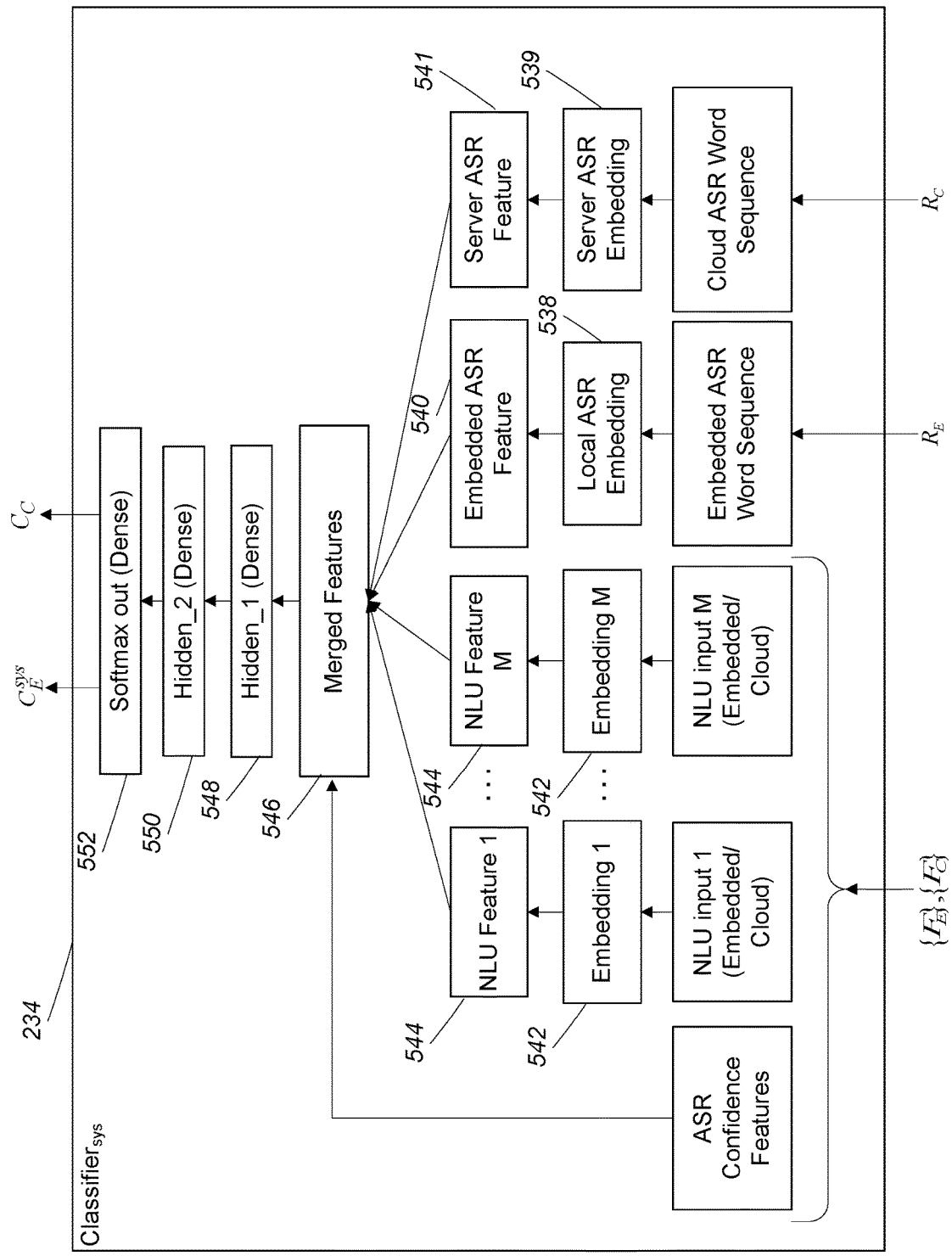
FIG. 5 is a system classifier.

Referring to FIG. 5, in some examples, the system classifier 234 is implemented as a feed-forward deep neural network (DNN) classifier with ReLu activation on a hidden layer and softmax activation on an output layer.

In an example of runtime operation of the system classifier, the inputs to the system classifier 234 first are preprocessed. To do so, the embedded result, $R_E$ (sometimes referred to as the "embedded ASR word sequence") is processed in a local ASR embedding module 538 to form an embedded ASR feature 540. The cloud result, $R_C$ (sometimes referred to as the "cloud ASR word sequence") is processed in a server ASR embedding module 539 to form a server ASR feature 541. In some examples the local ASR embedding module 538 and the server ASR embedding module 593 turns word sequences in $R_E$ and $R_C$ into word embeddings having a vocabulary including the 1,000 most frequent words from the embedded ASR/NLU module 120 and the cloud ASR/NLU module 126, an entry for out-of-vocabulary words, and an entry for padding (e.g., the ASR word sequences are padded or trimmed to 6 words).

The NLU features in the set of embedded features, $\{F_E\}$ and the NLU features in the set of cloud features, $\{F_C\}$ are processed in NLU embedding modules 542 to form corresponding embeddings of the NLU features 544. In some examples, the embeddings of the NLU features 544 are used because the reduce a number of parameters in the input data, thereby reducing overfitting in the training of the system classifier 234.

The embedded ASR feature 540, the cloud ASR feature 541, the embeddings of the NLU features 544, and the ASR confidence features from the set of embedded features, $\{F_E\}$ and the set of cloud features, $\{F_C\}$ are merged in an input layer to form merged features 546. The merged features 546 are processed in a first hidden layer 548, a second hidden layer 550, and a softmax output layer 552 to generate an embedded confidence score, $C_E^{sys}$ and a cloud confidence score, $C_C$ (the sum of which is equal to 1).

3 Training

3.1 System Classifier Training

In some examples, system classifier 234 is modeled as a forced choice classification problem where the goal is to select the result (either the embedded result or the cloud result) with minimum ASR errors. To train a classifier for this task, a classification target for each utterance is defined as the ASR result that has the lowest word error rate. In some examples, the word error rates for both the embedded ASR and the cloud ASR are the same. For example, both the embedded ASR and the cloud ASR would recognize "cancel" with very high accuracy. Depending on how those utterances are handled, there are four different target definitions:

Target ver. 1: pick embedded result as much as possible.
Target ver. 2: pick cloud result as much as possible.
Target ver. 3: Divide into 3 categories: cloud better, embedded better, or cloud and embedded work equally well.
Target ver. 4: exclude all the cases where cloud and embedded work equally well from training.

As is noted above, the following features from both the embedded and cloud results are used in training the system arbitrator.

ASR confidence scores, normalized to [0,1].
NLU dialogue context, which defines what domains and contexts are supported in the current dialog stage (implemented as a stack of domains and contexts).
NLU recognized domain name.
NLU recognized context name.
NLU recognized action name.
NLU recognized entity names.
ASR top NBest word sequence.

As is also noted above, if an embedding (shared by embedded and cloud) is trained for each of the NLU features, the classification performance is slightly better, probably due to the input data being more compact, the model having less parameters to learn, thus harder to overfit in training.

In some examples, the deep neural network of the system classifier 230 is trained on a development set of training data using a parameter optimization algorithm such as stochastic gradient descent or the Adam optimizer with an early stop-ping strategy.

3.2 Short Circuit Classifier Training

In some examples, the short circuit classifier is modeled as a machine learning problem, with the optimization goal being the highest short-circuiting triggering rate while keeping the false positive rate below a threshold, such as, 0.3%. The target class is "the embedded result is better than or as good as the cloud result." The triggering rate is the percentage of the traffic (i.e., results) that doesn't wait for cloud, and the term false positive means that the classifier incorrectly did not wait for the cloud results.

The short circuit classifier is trained in a similar fashion as the system classifier, but only receives the embedded features as input. The short circuit classifier is trained to achieve the following result:

if classification confidence $\geq T$: don't wait else: wait for cloud result
where the threshold T is tuned based on a development set of training data.

In some examples, the deep neural network of the short circuit classifier 234 is trained on the development set of training data using a parameter optimization algorithm such as stochastic gradient descent or the Adam optimizer with an early stop-ping strategy.

4 Alternatives

In the examples described above, deep neural network-based classifiers are used in the arbitration scheme. However, other types of classifiers can be used such as Gaussian based naive Bayes classifiers, logistic regression-based classifiers, linear kernel and radial basis function (RBF) kernel state vector machine (SVM) classifiers, and a random Forest with 500 trees.

5 Implementations

The approaches described above can be implemented, for example, using a programmable computing system (e.g., an automobile navigation computer) executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program. The modules of the program can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The system may also be considered to be implemented as a tangible, non-transitory medium, configured with a computer program, where the medium so configured causes a computer to operate in a specific and predefined manner to perform one or more of the processing steps described herein.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A method for selecting a speech recognition result on a computing device, the method comprising:
   acquiring first speech data for a first utterance;
   soliciting a first speech recognition result from the computing device including sending the first speech data to the computing device;
   soliciting a second speech recognition result from a cloud computing service including sending the first speech data to the cloud computing service;
   receiving the first speech recognition result determined by the computing device;
   receiving a first plurality of features, at least some of the features being determined using the first speech recognition result;
   determining, prior to receiving the second speech recognition result from the cloud computing service, whether to select the first speech recognition result or to wait for the second speech recognition result based at least in part on the first speech recognition result and the first plurality of features; and
   selecting the first speech recognition result based on the determining.

2. The method of claim 1 wherein the determining includes computing, based at least in part on the first speech recognition result and the first plurality of features, a confidence value for the first speech recognition result and comparing the confidence value to a first predetermined threshold.

3. The method of claim 2 wherein selecting the first speech recognition result based on the determining includes selecting the first speech recognition result if the confidence value exceeds the first predetermined threshold.

4. The method of claim 2 wherein computing the first confidence value includes processing the first speech recognition result and the first plurality of features in a classifier.

5. The method of claim 4 wherein the classifier is implemented as a neural network.

6. The method of claim 1 wherein at least some of the first plurality of features characterize a quality of the first speech recognition result.

7. The method of claim 1 further comprising providing the selected first speech recognition result for subsequent processing by the computing device.

8. The method of claim 1 wherein the first plurality of features includes one or more of a natural language understanding dialogue context, a natural language understanding recognized domain name, a natural language understanding recognized context name, a natural language understanding recognized action name, one or more natural language understanding recognized entity names, and an NBest word sequence.

9. The method of claim 1 further comprising performing an action based at least in part on the selected speech recognition result.

10. The method of claim 1 further comprising:
    acquiring second speech data for a second utterance;
    soliciting a third speech recognition result from the computing device including sending the second speech data to the computing device;
    soliciting a fourth speech recognition result from the cloud computing service including sending the second speech data to the cloud computing service;
    receiving the third speech recognition result determined by the computing device;
    receiving a second plurality of features, at least some of the features being determined using the third speech recognition result;
    determining, prior to receiving the fourth speech recognition result from the cloud computing service, whether to select the third speech recognition result or to wait for the fourth speech recognition result based at least in part on the third speech recognition result and the second plurality of features; and
    waiting for the fourth speech recognition result based on the determining.

11. The method of claim 10 further comprising:
    receiving the fourth speech recognition result from the cloud computing device;
    receiving a third plurality of features, at least some of the features being determined using the fourth speech recognition result;
    computing, based at least in part on the third speech recognition result and the second plurality of features, a second confidence value for the third speech recognition result;
    computing, based at least in part on the fourth speech recognition result and the third plurality of features, a third confidence value for the fourth speech recognition result; and
    selecting the fourth speech recognition result based at least in part on a comparison of the second confidence value to the third confidence value.

12. The method of claim 11 wherein selecting the fourth speech recognition result includes determining that the third confidence value is greater than the second confidence value.

13. The method of claim 11 further comprising providing the selected fourth speech recognition result for subsequent processing by the computing device.

14. A system for selecting a speech recognition result on a computing device, the system comprising:
    a first input for acquiring first speech data for a first utterance;
    an output for soliciting a first speech recognition result from the computing device including sending the first speech data to the computing device and soliciting a second speech recognition result from a cloud computing service including sending the first speech data to the cloud computing service;
    a second input for receiving the first speech recognition result determined by the computing device and receiving a first plurality of features, at least some of the features being determined using the first speech recognition result;
    one or more processors for determining, prior to receiving the second speech recognition result from the cloud computing service, whether to select the first speech recognition result or to wait for the second speech recognition result based at least in part on the first speech recognition result and the first plurality of features and selecting the first speech recognition result based on the determining.

15. Software stored on a non-transitory, computer-readable medium, the software including instructions for causing one or more processors to perform steps to select a speech recognition result on a computing device, the steps including:

acquiring first speech data for a first utterance;

soliciting a first speech recognition result from the computing device including sending the first speech data to the computing device;

soliciting a second speech recognition result from a cloud computing service including sending the first speech data to the cloud computing service;

receiving the first speech recognition result determined by the computing device;

receiving a first plurality of features, at least some of the features being determined using the first speech recognition result;

determining, prior to receiving the second speech recognition result from the cloud computing service, whether to select the first speech recognition result or to wait for the second speech recognition result based at least in part on the first speech recognition result and the first plurality of features; and selecting the first speech recognition result based on the determining.

* * * * *